(No Model.)
G., L. & D. NEUKOMM.
BAND CUTTER AND GRAIN FEEDER FOR THRASHERS.
No. 312,006. Patented Feb. 10, 1885.
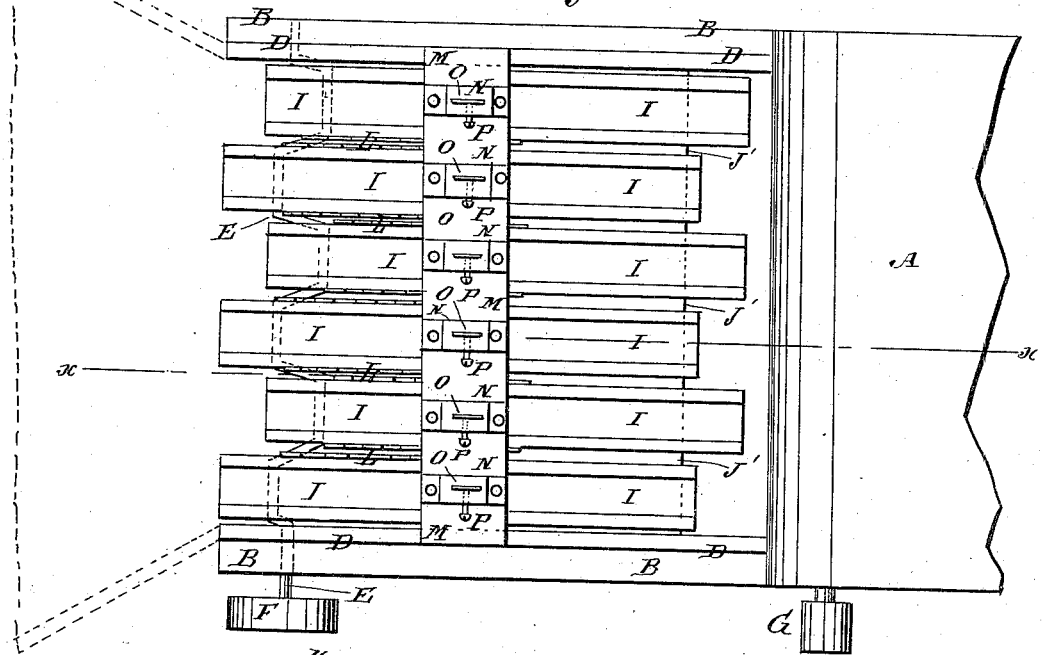
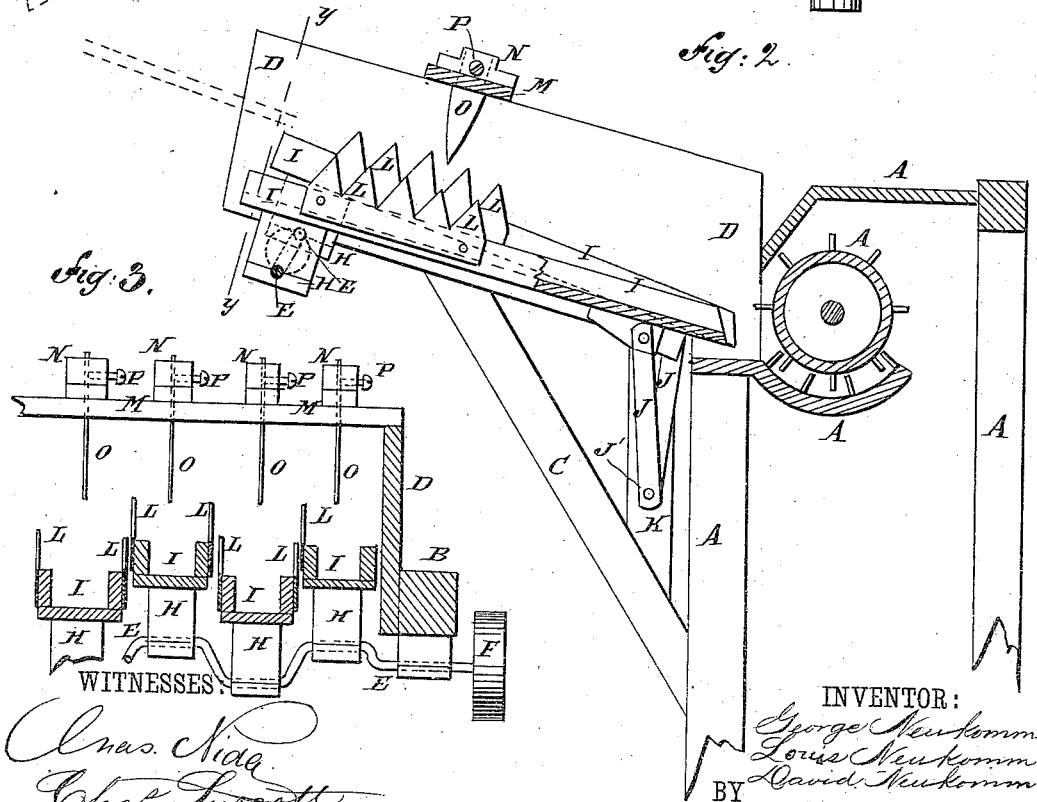
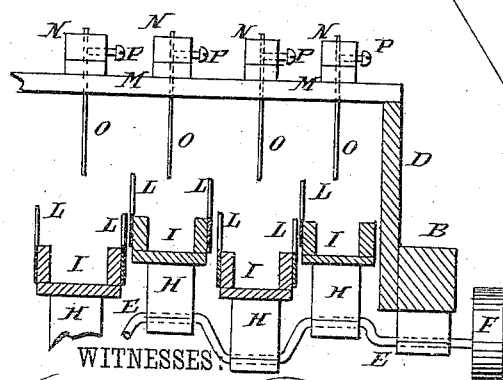
WITNESSES:
Chas. Nida
Chas. Lucott
INVENTOR:
George Neukomm
Louis Neukomm
David Neukomm
BY
ATTORNEYS.

UNITED STATES PATENT OFFICE.

GEORGE NEUKOMM, LOUIS NEUKOMM, AND DAVID NEUKOMM, OF TREMONT, ILLINOIS.

BAND-CUTTER AND GRAIN-FEEDER FOR THRASHERS.

SPECIFICATION forming part of Letters Patent No. 312,006, dated February 10, 1885.

Application filed September 10, 1884. (No model.)

*To all whom it may concern:*

Be it known that we, GEORGE NEUKOMM, LOUIS NEUKOMM, and DAVID NEUKOMM, all of Tremont, in the county of Tazewell and State of Illinois, have invented a new and useful Improvement in Band-Cutters and Grain-Feeders for Thrashers, of which the following is a full, clear, and exact description.

Reference is to be had to the accompanying drawings, forming a part of this specification, in which similar letters of reference indicate corresponding parts in all the figures.

Figure 1 is a plan view of our improvement and showing a part of a thrasher. Fig. 2 is a sectional side elevation of the same, taken through the broken line $x$ $x$, Fig. 1. Fig. 3 is a sectional rear elevation of a part of the same, taken through the line $y$ $y$, Fig. 2.

The object of this invention is to provide a mechanism for cutting the bands of grain-bundles and feeding the grain to the thrasher in a regular and uniform manner.

The invention consists of the combinations of parts and their construction, substantially as hereinafter fully set forth and claimed.

A represents a thrashing-machine. B are side bars, the forward ends of which are attached to the frame of the thrasher A, and their ends are supported by inclined braces C, attached to the said thrasher-frame. To the side bars, B, are attached side boards, D, to confine the grain while having its bands cut and being fed to the thrasher.

In journals attached to the lower sides of the outer ends of the side bars, B, revolves a shaft, E, one end of which projects and has a pulley, F, attached to it, so that the said shaft can be driven by a belt from a pulley, G, attached to a journal of the thrasher-cylinder.

Upon the shaft E are formed cranks, projecting from the opposite sides of the said shaft, and which revolve in bearings H, attached to the lower sides of the rear ends of a number of feed or shaker bars, I, placed side by side, and pivoted at the lower sides of their forward ends to the upper ends of short supporting-bars J. The lower ends of the bars J are pivoted by a rod, J', to bars K, attached to the side bars, B, and the braces C. The upper sides of the feed-bars I are grooved or channeled longitudinally, as shown in Fig. 3, and to the rear parts of the sides of the said bars are attached plates L, having angular cutting-teeth projecting above the said bars, as shown in Figs. 1, 2, and 3.

To the upper edges of the side boards, D, a little in the rear of their centers, are attached the ends of a cross-bar, M, to which, directly over each feed-bar I, are attached bearing-blocks N.

Through the bar M and blocks N are formed slots to receive the shanks of the downwardly-projecting knives O, which are secured in place by set-screws P, passing through the sides of the blocks N, and resting against the sides of the shanks of the knives O, as shown in the drawings, so that the said knives can be readily adjusted higher or lower, as may be required.

The machine is designed to be provided with a table, as indicated in dotted lines in Figs. 1 and 2, upon which the bundles of grain can be pitched, and from which the said bundles are fed to the thrasher.

With this construction, when the machine is in operation, the alternate bars I will be moved upward, forward, downward, and rearward, causing the knives L O to cut the bands of the bundles, spreading the grain and carrying it forward to the thrasher.

Having thus described our invention, we claim as new and desire to secure by Letters Patent—

1. A combined band-cutter and grain-feeder constructed substantially as herein shown and described, and comprising the side bars and boards, B D, the crank-shaft E and its driving mechanism, the feed-bars I, provided with toothed cutting-plates L, and the cross-bar M, provided with knives O, substantially as herein shown and described, whereby the bands of grain-bundles will be cut and the grain spread and carried to the thrasher, as set forth.

2. In a combined band-cutter and grain-feeder, the combination, with the thrasher A, of the side bars and boards, B D, the crank-shaft E and its driving mechanism, the pivoted supporting-bars J, and the vibrating grooved feed-bars I, provided with toothed cutting-plates L, substantially as herein shown and described, whereby the bands of grain-bundles will be cut and the grain spread and carried forward to the thrasher, as set forth.

3. In a combined band-cutter and grain-feeder, the combination, with the side boards, D, and the vibrating feed-bars, of the cross-bar M, provided with holding-blocks N and set-screws P, and the stationary knives O, substantially as herein shown and described, to assist in cutting the bands and spreading the grain as the grain is fed forward, as set forth.

GEORGE NEUKOMM.
    LOUIS NEUKOMM.
    DAVID NEUKOMM.

Witnesses:
 A. J. DAVIS,
 D. C. AMES.